United States Patent [19]

Sloan

[11] 4,049,519
[45] Sept. 20, 1977

[54] CARBONATE REDUCTION

[76] Inventor: Walter John Sloan, 214 Jupiter Road, North Star, Newark, Del. 19711

[21] Appl. No.: 730,086

[22] Filed: Oct. 6, 1976

[51] Int. Cl.$^2$ ............................................. B01D 13/02
[52] U.S. Cl. .................................. 204/180 P; 204/301
[58] Field of Search ................... 204/74, 91, 110, 127, 204/130, 131, 151, 180 P, 301

[56] References Cited

U.S. PATENT DOCUMENTS

| 3,344,050 | 9/1967 | Mayland et al. | 204/180 P X |
|---|---|---|---|
| 3,761,369 | 9/1973 | Tirrell | 204/151 |
| 3,896,015 | 7/1975 | McRae | 204/180 P |
| 3,901,781 | 8/1975 | Passino et al. | 204/180 P |
| 3,964,985 | 6/1976 | Giuffrida | 204/180 P |
| 3,968,017 | 7/1976 | Canata et al. | 204/180 P |

OTHER PUBLICATIONS

"Cyanide Copper Plating," Plating Product Bulletin No. 41, Indust. Chem. Dept., Du Pont, Wilmington, Del. 19898.

Katz, "Electrodialysis Preparation of Boiler Feed and Other Demineralized Waters," (1971), Amer. Power Conference, vol. 33.

Hamilton et al., "Calculations of Analytical Chemistry," McGraw-Hill, New York, N.Y., (1947), pp. 199-205.

Ionics Bulletin L-2, "Stackpack", Ionics, Inc. Watertown, Mass., 1963.

Primary Examiner—Arthur C. Prescott
Attorney, Agent, or Firm—Connolly and Hutz

[57] ABSTRACT

Reduction of carbonate concentrations in cyanide-containing electroplating baths and congeneric solutions using an electrolytic cell, equipped with cation permselective membranes, by the selective addition of hydrogen ions whereby the carbonate ions are converted, in sequence, to bicarbonate ions and then to carbonic acid which decomposes to water and carbon dioxide.

14 Claims, 2 Drawing Figures

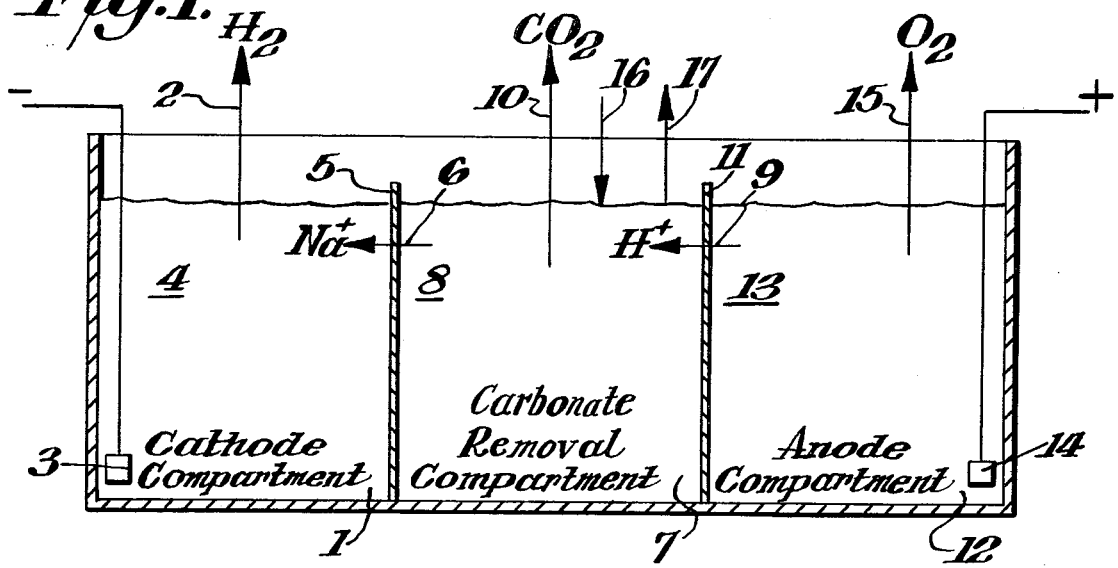
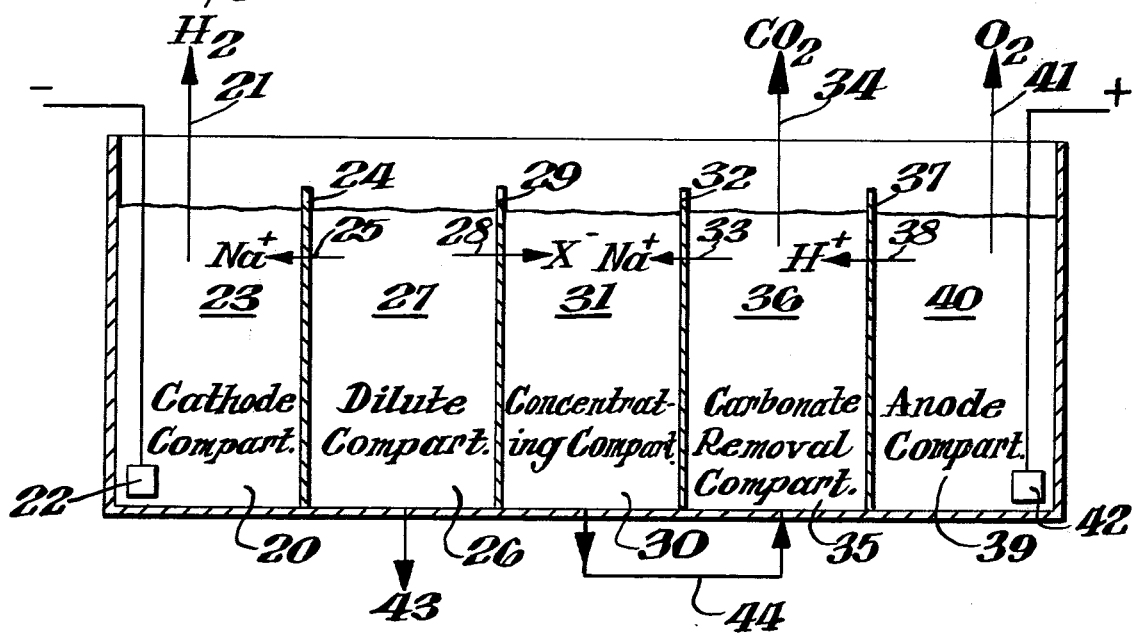

CARBONATE REDUCTION

BACKGROUND OF THE INVENTION

Baths containing "free" cyanide as the alkali metal salt(s) and metal cyanide complexes are frequently used for electroplating copper, zinc, silver, gold, brass and other metals because the high "throwing" power of cyanide electrolytes promotes uniformity of deposits, because the rate of metal deposition is high for both large and small parts, and because of compatibility with various conventional additives which can be used to control the character of the plated surfaces. Some cyanide ions are oxidized to form carbonate ions, and this reaction appears to be accelerated by visible radiation, and by increased temperatures (H. Graham Silver, Jour. Electrochemical Soc., 116, 26C–32C, (1969)). The alkali metal hydroxides in the cyanide baths also react with carbon dioxide from the surrounding air to produce the alkali metal carbonate. Carbonates are reported as being formed by hydrolysis of cyanide.

A limited amount of carbonate salts can be desirable because of improved electrical conductivity, or to provide alkalinity for chemical buffering action in systems which contain hydroxide ions. Excessive amounts of carbonate salts decrease the cathode efficiency when brass or copper is being plated from cyanide-containing baths, and adversely affect the appearance of the plated surface. Usually, the carbonate salts of cyanide-containing plating baths are controlled by "drag out" of plating solution with plated products, by controlled blowdown of bath to waste, by crystallization of alkali metal carbonates by natural and artificial refrigeration, by precipitation as an alkaline earth carbonate (see U.S. Pat. No. 2,164,924), by the use of mineral and organic acids, and, more recently, by an ion exchange process (U.S. Pat. No. 3,661,734). In each of these processes, it is either necessary or desirable to start with a relatively concentrated solution of carbonate salt(s). For this reason, the concentration of carbonate salts, in plant operation, is usually above the desired or optimum value for good plating.

There are problems associated with the prior art processes. Artificial refrigeration is expensive. Chemicals are discarded, or are used to make salts which are discarded. Valuable metals and salts are lost unless the solids such as calcium carbonate and sodium carbonate are rinsed, and the rinse solution is recycled. Rinse solution requires evaporation to concentrate the plating bath components. If recovery is not practiced, oxidizing chemicals such as chlorine, hypochlorites, hydrogen peroxide, or permanganate are required to destroy the cyanide, and alkaline chemicals are required to precipitate the metals as hydroxides. The solid carbonates and precipitated metal hydroxides must ultimately be disposed of in a safe and suitable manner.

SUMMARY

U.S. Pat. No. 3,661,734 introduced the concept of converting alkali carbonates to carbon dioxide by the use of hydrogen ions from ion exchange resins. This invention provides an alternate method, not having the disadvantages of prior art, to remove, either continuously or by batch operation, controlled amounts of carbonate ions from plating baths and congeneric solutions, such as rinse water, concentrated rinse water, concentrated bath, and collected drips, which can then be recycled to the main plating system without the use of chemicals other than water, without the production of any solid or liquid, other than valuable alkali metal hydroxide solution, which must be treated or disposed of in some manner, and without requiring a relatively high carbonate concentration in the solution being treated.

Generally, this invention comprises the removal of carbonate ions from cyanide-containing electroplating baths and congeneric solutions, including the following steps:

1. adding an acidic solution to the anodic compartment of a three compartmented electrolytic cell having two cation permselective membranes separating the compartments,
2. adding an electrolytically conductive solution to the cathodic compartment of the electrolytic cell,
3. adding the solution containing carbonate ions to the carbonate removal compartment between the anodic and the cathodic compartments,
4. applying energy, as direct electrical current, by the use of the anode and the cathode in the electrical cell, to cause hydrogen ions present in the acidic solution to leave the anodic compartment, pass through the adjacent cation permselective membrane, and enter the carbonate removal compartment holding the solution containing carbonate ions, neutralizing any causticity, and converting carbonate ions to bicarbonate ions which, in turn, are converted to carbonic acid which decomposes to water and carbon dioxide,
5. concomitantly, causing alkali metal cations, because of the applied electrical potential, to leave the carbonate removal compartment, enter the cathodic compartment by passing through the second permselective membrane, and mix, in the cathodic compartment, with the electrolytically conductive solution which now contains hydroxide ions as the result of the reduction of alkali metal cations, at the cathode, to metal which immediately reacts with water to form the metal hydroxide and hydrogen and,
6. recycling the solution containing carbonate ions, now devoid of causticity and depleted of carbonate ions, to the plating operation.

The process converts to the carbonate ions to carbon dioxide which is dischaged to the atmosphere, and produces alkali metal hydroxides chemically equivalent to the sum of any hydroxide present in the processed solution and the alkali metal content of the converted carbonate salts. Sodium and potassium are the common alkali metals used in plating, either separately, or mixed. Part of the recovered hydroxides can be used to adjust the pH in the plating bath, and the excess can be used to treat acidic wastes. Recovery of the carbon dioxide would not normally be economical. The process is not limited by temperature as long as the system is liquid.

Carbonate ions can be converted to carbonic acid at a controlled rate by the use of an electrolytic cell equipped with cation permselective membranes. The membranes are made by incorporating cation exchange functionality into homogeneous or heterogeneous sheets. For example, "Nafion" is a perfluorosulfonic membrane made by E. I. duPont de Nemours and Co., Wilmington, Del. 19898 (see U.S. Pat. Nos. 3,282,875 and 3,925,135). Other cation permselective membranes are made by Ionics, Inc., Watertown, Mass. 02172, and Ionac Chemical Co., Birmingham, N.J. 08011. The active exchange group may be a sulfonic, a carboxylic, a phosphonic, or any other group or configuration which exhibits cation exchange properties. The binder or matrix must be stable in the process stream. Anions are repelled, or are not permitted to enter the cation exchange media, because of the large electrostatic negative charges associated with the active cation exchange groups. The efficiency for selective passage of only cations is relatively high. However, some leakage occurs through permselective membranes because of imperfections, and the leakage is accentuated by high hydrostatic pressure differences across membranes, and by a decrease in viscosity as the temperature is raised. Membranes of high electrical conductivity are preferred when all their other properties are satisfactory.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIGS. 1 and 2 are diagrammatic representations of electrolytic cells suitable for carrying out the improved process of this invention;

FIG. 1 represents a cross section of the simplest arrangement for producing the desired carbonate ion removal of this invention; and FIG. 2 represents an increase in number of compartments to permit concentration of weak plating solutions by electrodialysis, prior to carbonate removal.

DESCRIPTION OF THE PREFERRED EMBODIMENTS

FIG. 1 shows a diagrammatic sectional view of a three compartmented electrolytic cell in accordance with this invention. Compartments 1 and 12 are separated by cation permselective membranes 5 and 11. The cathodic compartment 1 contains a cathode 3, and an alkaline catholyte 4 consisting of water and an alkali metal hydroxide. Cathode 3 is, for example, made of platinum-plated titanium or tantalum. The anodic compartment 12 contains an anode 14, and an acidic anolyte 13 consisting of water and a mineral acid. Anode 14 is, for example, made of platinum-plated titanium or tantalum. The carbonate removal compartment 7 holds the aqueous carbonate containing solution 8 to be treated. This solution 8 contains a mixture of alkali metal carbonate, alkali metal hydroxide or bicarbonate, the alkali metal salts of cyanide and complex metal cyanides, impurities such as ferrocyanide, and, frequently, additives to improve the appearance of the plated surface.

When a direct electrical current is passed through compartments 1, 7 and 12, the positive alkali metal ions 6, usually sodium and/or potassium, are attracted towards the cathode 3 which, characteristically, has a negative charge, and pass through the cation permselective membrane 5 into the cathodic compartment 1. When the alkali metal cations 6 reach the cathode 3, they are reduced, electrically, to their metallic state, which immediately reacts with water to form the alkali metal hydroxide and hydrogen 2 which is evolved as a gaseous byproduct. Concomitantly, the positive hydrogen ions 9 in anolyte 13 are attracted by the negative cathode 3, and pass into the carbonate removal compartment 7 where they react, first with any hydroxide ions which are present to form water. Additional hydrogen ions 9 react with the carbonate ions to form bicarbonate ions. Further reaction with hydrogen ions 9 converts the bicarbaonate ions to carbonic acid which decomposes to form water and carbon dioxide 10. These reactions are shown by the following equations:

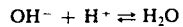

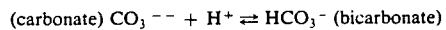

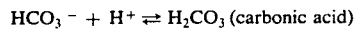

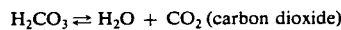

This continuity is stoichiometric because an alkali metal ion 6 moves out of the carbonate removal compartment 7 at the same time that a hydrogen ion 9 moves into the carbonate removal compartment 7. No hydrogen ions 9 will move out of the carbonate removal compartment 7 unless the pH is somewhat below 7.0. The carbonic acid ionizes only slightly, and decomposes readily. The hydrogen ion 9 balance in the anodic compartment 12 is restored by the ionization of water to produce hydrogen ions and hydroxide ions. The hydroxide ions are oxidized to form water and oxygen 15, which is evolved as byproduct gas. The oxygen 15 can be used to oxidize a trade water. The hydrogen 2 can be burned with the oxygen 15 to produce pure water. Under some circumstances, the hydrogen 2 and the oxygen 15 might be reacted in a fuel cell to produce part of the electrical power required for the carbonate ion removal process.

Water must be added to the anodic compartment 12 because water is lost by the conversion to hydrogen 2 and to oxygen 15. Water is also transferred from the anodic compartment 12 because the hydrogen ions 9 are hydrated and this water is carried into the carbonate removal compartment 7. Likewise, the alkali metal ions 6 are hydrated, and this water is carried from the carbonate removal compartment 7 into the cathodic compartment 1. In practice, the cathodic compartment 1 will overflow with a caustic solution 4 representing the alkali metal hydroxide and the water of hydration.

Normally, the solution 8 to be processed for carbonate ion removal would be introduced into the bottom of the carbonate removal compartment 7 because of the rising bubbles of carbon dioxide 10. At high current densities, such as 300 amperes per square foot, a relatively rapid upward flow rate, to cause mixing, is indicated because a high current density means a high concentration of hydrogen ions 9 in the carbonate removal compartment 7 at the surface of membrane 11. A high hydrogen ion 9 concentration at this location will cause the formation of insoluble cyanides of the metals being plated.

The conversion of the carbonate ions of solution 8 in compartment 7 can be achieved (a) when solution 8 is held in compartment 7, (b) when solution 8 is recycled through compartment 7, (c) when solution 8 is displaced from compartment 7 by untreated solution 16 and is removed as treated solution 17 on a once through basis, and (d) when the bulk of solution 8 is recycled through compartment 7 and untreated solution 16 is added as increments or continuously with removal of treated solution 17 as increments or continuously. The choice of procedure will depend on the plating bath composition and the design of the cell.

For installations where large quantities of alkali carbonate are to be removed, control of pH and temperature would be best accomplished if separate electrolyte cells were used in sequence, to neutralize hydroxide ions or neutralize hydroxide ions and convert carbonate ions to bicarbonate ions, to convert carbonate ions to bicarbonate ions, and to convert bicarbonate ions to carbonic acid, respectively.

FIG. 2 is a diagrammatic representation of a five compartmented electrolytically cell consisting of a cathodic compartment 20 containing a catholyte 23 of water and alkali metal hydroxide, compartment 26 containing dilute plating solution 27, compartment 30 containing a more concentrated plating solution 31, compartment 35 holding a plating solution 36 containing carbonate ions, and an anodic compartment 39 holding an anolyte 40 of mineral acid and water. Permselective membranes are located in the five compartmented cell as follows:

| Membrane Type | Reference Number | Located Between Compartments |
|---|---|---|
| cation permselective | 24 | 20 and 26 |
| anion permselective | 29 | 26 and 30 |
| cation permselective | 32 | 30 and 35 |
| cation permselective | 37 | 35 and 39 |

When direct electrical current is applied to cathode 22 in compartment 20, the anode 42 in compartment 39, the following occur concomitantly:

a. Alkali metal cations in the dilute plating solution 27 in compartment 26, attracted toward the negative cathode 22 in compartment 20, pass through the cation permselective membrane 24 separating compartments 20 and 26, move to the cathode 22 in compartment 20, and are electrically reduced to metal which immediately reacts with water to form the alkali metal hydroxide and hydrogen gas 21 which escapes from compartment 20.

b. Because of the attraction of the positive anode 42 in anodic compartment 39, anions 28 from the dilute plating solution 27 pass through the anion permselective membrane 29, enter compartment 30, and pair with alkali metal cations 33 which, under the attraction of cathode 22 in compartment 20, have passed from compartment 35 and through membrane 32. The resulting more concentrated plating solution 31 is delivered, for carbonate ion removal, to compartment 35 by means of bypass line 44. Cations do not pass through anion permselective membranes because they are repelled by the highly positively charged matrix containing the ion exchange groups. Dilute plating waste, depleted of electrolytes, is purged as waste 43 from compartment 26.

c. Hydrogen ions 38 pass from compartment 39 through cation permselective membrane 37 into compartment 35, neutralize any hydroxide alkalinity, convert carbonate ions to bicarbonate ions which, in turn, are converted to carbonic acid which decomposes to form water and carbon dioxide 34 with the latter escaping from compartment 35.

d. When hydrogen ions 38 leave compartment 39, water ionizes to form an equivalent of hydrogen ions and hydroxide ions. The hydroxide ions are electrically oxidized at the anode 42 in compartment 30 to form water and oxygen 41 which evolves from the anodic compartment 39. If two or more electroldialysis units are operated in series, a relatively high concentration of dissolved salts can be obtained.

Two or more unit cells, of three or more compartments with suitable electrodes and membranes, can be arranged in series to simplify construction and to facilitate amperage control.

Carbonates, particularly sodium carbonate, are removed from plating baths and concentrates of plating wastes and rinses by crystallization. The mother liquor, somewhat reduced in carbonate content, can be returned to the plating bath system. Some mother liquor will be retained by the crystals. The carbonate crystals can be converted to carbon dioxide and alkali metal hydroxide after dissolution in water and using the solution as feed to the carbonate removal compartment 7 of the carbonate removal cell outlined as FIG. 1. This removal of carbonate from soluble carbonate crystals can be conducted at plating shops or elsewhwere such as by firms who are paid to dispose of carbonate wastes from plating operations.

Zinc, which is amphoteric, forms complex hydroxides with hydroxide ions in strongly basic solutions. Removal or neutralization of the hydroxide groups associated with zinc, by hydrogen ions in the carbonate removal compartment 7 of FIG. 1, leaves the zinc as a cation which will react, in the order, (a) with sodium cyanide to form the zinc cyanide complex, or (b) with ferrocyanide, which is commonly found in cyanide plating systems, to form the quite insoluble zinc ferrocyanide, depending on what anions are available. This could be the basis for a commercial method for the removal of ferrocyanide from cyanide plating baths.

The loss of cyanide as hydrogen cyanide can be moderated by reacting cyanide ions with a metal cyanide, e.g., cuprous cyanide, (U.S. Pat. No. 3,656,893, Col. 1, line 63, et seq.), or with metal ions, e.g., $Cu^{30}$, preferably electrolytically produced.

The process for removing carbonates from plating baths could be used to remove carbonates and bicarbonates from other solutions and could be used to removed other gas forming substances from solution. For example, a sulfide can be converted to hydrogen sulfide. Also, a sulfite can be converted to sulfurous acid which decomposes on heating to form water and sulfur dioxide. This latter conversion might be applied to the recovery of sulfur values from solutions used to scrub sulfur dioxide from stack gases.

In some cases where the sodium carbonate concentration is relatively high, and in brass baths which in the pH range of about 9.5–10.5 contain both carbonate and bicarbonate ions, the solubility of sodium bicarbonate may be exceeded when the carbonate ions are converted to bicarbonate ions. In effect, carbonate ions have been removed from the solution if the precipitated sodium bicarbonate is settled-out, or is removed by filtration. This procedure could be cheaper than refrigeration by artificial means, and would provide better control for carbonate ion removal. However, there is still the problem of washing the solids, and treating the residual solids for cyanide destruction, and for metal recovery. The precipitated bicarbonate can be retained, or separated, and recycled through the carbonate removal system, and will ultimately be converted to carbon dioxide. The precipitation of potassium bicarbonate could occur but is unlikely because of its high solubility.

Table I shows the relationships among the various forms of alkalinity as a function of pH. The hydroxide ion concentration of a plating bath can be titrated, with a standard acid, by the use of La Motte sulfo orange indicator (pH range 11.0–12.6). The carbonate ion concentration in plating baths is commonly determined by titrating, with a standard acid, barium carbonate which is precipitated from the baths after the addition of barium chloride.

Table II shows the fraction of carbon dioxide, in water, present as carbon dioxide, bicarbonate ion, carbonic acid, and carbonate ion, without relation to the total concentrations. These data show that pH can be used as an indicator of the removal, fron cyanide-containing electroplating baths, of hydroxide ions, and the conversion of carbonate ions to bicarbonate ions, and, finally, the conversion of bicarbonate ions to carbonic acid which decomposes to water and carbon dioxide. Table II shows that the bicarbonate fraction peaks in the pH range of 8.0–8.5, and that very little carbon dioxide is present until the pH is reduced below that range. The carbonic acid fraction is always small.

Tables III, IV, and V illustrate the removal of carbonates from a synthetic mixture, and from actual plating baths by the use of the three compartmented cell shown in FIG. 1.

TABLE I
pH SCALE IN RELATIONSHIP TO HYDROXIDE, CARBONATE AND BICARBONATE ALKALINITIES

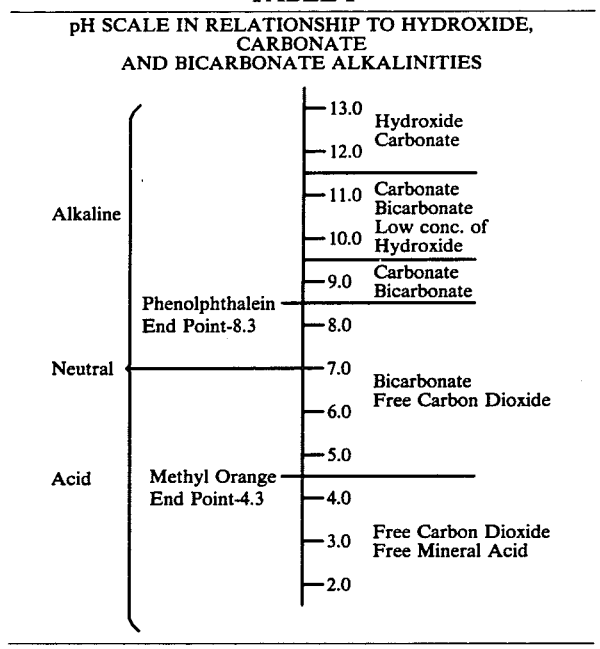

FRACTION OF TOTAL CARBON DIOXIDE PRESENT AS

| pH | $CO_2$ | $HCO_3$ | $H_2CO_3$ | $CO_3$ |
|---|---|---|---|---|
| 3.0 | 0.997 | $4.39 \times 10^{-4}$ | $2.58 \times 10^{-3}$ | $2.46 \times 10^{-11}$ |
| 3.5 | 0.996 | 0.00138 | $2.58 \times 10^{-3}$ | $2.45 \times 10^{-10}$ |
| 4.0 | 0.993 | 0.00437 | $2.57 \times 10^{-3}$ | $2.45 \times 10^{-9}$ |
| 4.5 | 0.984 | 0.0137 | $2.54 \times 10^{-3}$ | $2.42 \times 10^{-8}$ |
| 5.0 | 0.955 | 0.0420 | $2.47 \times 10^{-3}$ | $2.35 \times 10^{-7}$ |
| 5.5 | 0.876 | 0.122 | $2.26 \times 10^{-3}$ | $2.16 \times 10^{-6}$ |
| 6.0 | 0.693 | 0.305 | $1.79 \times 10^{-3}$ | $1.71 \times 10^{-5}$ |
| 6.5 | 0.418 | 0.581 | $1.08 \times 10^{-3}$ | $1.03 \times 10^{-4}$ |
| 7.0 | 0.185 | 0.814 | $4.79 \times 10^{-4}$ | $4.56 \times 10^{-4}$ |
| 7.5 | 0.0669 | 0.931 | $1.73 \times 10^{-4}$ | 0.00165 |
| 8.0 | 0.0221 | 0.972 | $5.72 \times 10^{-5}$ | 0.00544 |
| 8.5 | 0.00701 | 0.976 | $1.81 \times 10^{-5}$ | 0.0173 |
| 9.0 | 0.00215 | 0.945 | $5.56 \times 10^{-6}$ | 0.0529 |
| 9.5 | $6.10 \times 10^{-4}$ | 0.849 | $1.58 \times 10^{-6}$ | 0.150 |
| 10.0 | $1.46 \times 10^{-4}$ | 0.641 | $3.77 \times 10^{-7}$ | 0.359 |
| 10.5 | $2.59 \times 10^{-5}$ | 0.361 | $6.71 \times 10^{-8}$ | 0.639 |
| 11.0 | $3.44 \times 10^{-6}$ | 0.151 | $8.91 \times 10^{-9}$ | 0.848 |
| 11.5 | $3.84 \times 10^{-7}$ | 0.0345 | $9.94 \times 10^{-10}$ | 0.946 |
| 12.0 | $3.99 \times 10^{-8}$ | 0.0175 | $1.03 \times 10^{-10}$ | 0.982 |
| 12.5 | $4.04 \times 10^{-9}$ | 0.00561 | $1.04 \times 10^{-11}$ | 0.994 |
| 13.0 | $4.05 \times 10^{-10}$ | 0.00178 | $1.05 \times 10^{-12}$ | 0.998 |

$$H_2O + CO_2 \rightleftharpoons H_2CO_3$$

$$K_1 = \frac{[H_2CO_3]}{[CO_2]} = 2.6 \times 10^{-3}$$

-continued $$H_2CO_3 \rightleftharpoons HCO_3^- + H^+$$

$$K_2 = \frac{[H^+][HCO_3^-]}{[H_2CO_3]} = 1.7 \times 10^{-4}$$

$$HCO_3^- \rightleftharpoons CO_3^{--} + H^+$$

$$K_3 = \frac{[H^+][CO_3^{--}]}{[HCO_3^-]} = 5.6 \times 10^{-11}$$

$$H_2O + CO_2 \rightleftharpoons H^+ + HCO_3^-$$

$$K_4 = \frac{[H^+][HCO_3^-]}{[CO_2]} = 4.4 \times 10^{-7}$$

From page 207, Ionic Equilibriums — A mathematical Approach J. N. Butler — Addison-Wesley Pub. Co. (1964), Reading, Mass.

TABLE III

| Mixed Sodium Hydroxide and Sodium Carbonate | | | | |
|---|---|---|---|---|
| Page | 55 | 61 | 67 | 71 |
| Volume-Start-ml | 350 | 250 | 260 | 250 |
| Final-ml | 273 | 190 | 228 | 230 |
| pH  Start | 12.5 | 12.2 | 12.1 | 12.4 |
| Final | 6.6 | 6.3 | 7.0 | 7.0 |
| *Alkalinity -ml | | | | |
| Phth  -Start | 10.9 | 10.9 | 14.6 | 14.6 |
| Final | 0 | 0 | 0 | 0 |
| M O   -Start | 16.5 | 16.5 | 20.3 | 20.3 |
| Final | 0.6 | 0.4 | 3.4 | 2.2 |

*Alkalinity is listed as ml of 0.1000 Normal HCl to titrate 1.00 ml of sample from the center compartment of cell equivalent to FIG. 1 to the phenolphthalein and methyl orange endpoints. All data are for center compartment.

TABLE IV

| Carbonate Removal from Copper Strike Bath | | | | | | | | |
|---|---|---|---|---|---|---|---|---|
| Page | Feed | 24 | 25 | 26 | 28 | 30 | 31 | 32 |
| pH Start | 11.6 | 11.6 | 11.6 | 11.7 | 11.9 | 11.7 | 11.9 | 11.9 |
| Final | — | 6.5 | 6.0 | 6.5 | 6.4 | 5.0 | 7.0 | 5.8 |
| $Na_2CO_3$-Start | 39.3 | — | — | — | — | — | — | — |
| Final as gm/liter | — | 0 | 0 | 0 | 0 | 0 | 0 | 0 |

TABLE V

| Carbonate Removal from Brass Baths | | | | | |
|---|---|---|---|---|---|
| Page | Feed | 15 | 18 | Feed | 33 |
| pH-Start | 11.3 | 11.3 | 11.3 | 10.9 | 10.9 |
| Final | — | 5.9 | 7.9 | — | 6.0 |
| $Na_2CO_3$-Start | 91.7 | — | — | ca.90 | — |
| Final as gm/liter | — | 0 | 0 | — | 0 |

I claim:
1. A process for the removal of carbonate ions from solutions, comprising the steps of:
   1. providing electrolytic cell having at least three compartments with two cation permselective membranes separating the cell into anodic, cathodic and carbonate removal compartments;
   2. adding an acidic solution to the anodic compartment;
   3. adding an electrolytically conductive solution to the cathodic compartment of the electrolytic cell;
   4. adding the solution containing carbonate ions to the carbonate removal compartment located between the anodic and cathodic compartments of the electrolytic cell;
   5. applying energy, as direct electrical current by the use of the anode and the cathode in the electrical cell, to cause hydrogen ions present in the acidic solution to leave the anodic compartment, pass through the adjacent cation permselective membrane, and enter the carbonate removal compartment holding the solution containing carbonate ions, neutralizing any causticity, and converting carbonate ions to bicarbonate ions which, in turn, are converted to carbonic acid which decomposes to water and carbon dioxide; and 6. concomitantly, causing cations, because of the applied electrical potential, to leave the carbonate removal compartment, enter the cathodic compartment by passing through the second cation permselective membrane, and mix, in the cathodic compartment, with the electrolytically conductive solution.

2. A process for the removal of carbonate ions from solutions according to claim 1, where carbonate ions are removed from cyanide-containing electroplating baths and congeneric solutions.

3. A process for the removal of carbonate ions from solutions according to claim 1, wherein the electrolytically conductive solution of step (3) comprises an aqueous solution of alkali metal hydroxide, the carbonate solution of step (4) comprises an aqueous solution containing alkali metal carbonate, and the cations of step (6) comprise alkali metal ions.

4. A process for the removal of carbonate ions from solutions, according to claim 1, in which the solution containing carbonate ions is flowed upwardly through the carbonate removal compartment of the electrolytic cell.

5. A process for the removal of carbonate ions from solutions, according to claim 1, wherein the solution containing carbonate ions is recycled, as a batch, through the carbonate removal compartment of the electrolytic cell.

6. A process for the removal of carbonate ions from solutions, according to claim 1, wherein the solution containing carbonate ions is passed once through the carbonate removal compartment of the electrolytic cell.

7. A process for the removal of carbonate ions from solutions, according to claim 1, wherein the solution containing carbonate ions is added either as increments or continuously to previously processed solution being recycled through the carbonate removal compartment of the electrolytic cell with incremental or continuous withdrawal of processed solution.

8. A process for the removal of carbonate ions from solutions, according to claim 1, in which causticity is completely removed and the carbonate ions are substantially converted to bicarbonate ions in one or more electrolytic cells prior to the partial conversion of bicarbonate ions to carbonic acid in one or more electrolytic cells.

9. A process for the removal of carbonate ions from solutions, according to claim 1 wherein the solution containing carbonate ions is a solution obtained by dissolving alkali metal carbonate crystals produced from plating baths and/or concentrated plating wastes or rinses.

10. A process for the removal of carbonate ions from solutions, according to claim 1, wherein the three compartments are supplemented by additional compartments, separated by permselective membranes, for accomplishing, by electrodialysis, the concentration of dilute solutions containing the ingredients of electroplating baths.

11. A process for the removal of carbonate ions from solutions, according to claim 1, in which carbonate ions are converted to bicarbonate ions, the metal bicarbonate precipitates, and the solids are removed from the process stream.

12. A process for the removal of carbonate ions from solutions, according to claim 1, in which carbonate ions are converted to bicarbonate ions, the bicarbonate precipitates as metal bicarbonate which is then dissolved, and the solution is added to the carbonate removal compartment of an electrolytic cell.

13. A process for the removal of carbonate ions from solutions, according to claim 1, wherein the solution containing carbonate and cyanide ions is replaced with an electrolytically conductive aqueous solution containing ions which are converted to an acid which is a gas or includes a gas on decomposition.

14. A process for the removal of carbonate ions from solutions, according to clam 1, wherein the solution containing carbonate ions also contains ferrocyanide ions and zinc which, in the absence of sufficient cyanide ions for complex formation, combine to form insoluble zinc ferrocyanide.

* * * * *

UNITED STATES PATENT AND TRADEMARK OFFICE
CERTIFICATE OF CORRECTION

PATENT NO. : 4,049,519

DATED : September 20, 1977

INVENTOR(S) : Walter John Sloan

It is certified that error appears in the above-identified patent and that said Letters Patent are hereby corrected as shown below:

Column 2, line 43, delete "to" following "converts".

Column 5, line 24, following "20" the "the" should be -- and --

Column 5, line 60, change "30" to -- 39 --

Column 6, line 31, change "Cu$^{30}$" to -- Cu$^+$ --

Column 6, line 34, change "removed" to -- remove --

Column 7, line 5, change "fron" to -- from --

Column 10, line 41, change "clam" to -- claim --

Signed and Sealed this

Twenty-eighth Day of March 1978

[SEAL]

Attest:

RUTH C. MASON
Attesting Officer

LUTRELLE F. PARKER
Acting Commissioner of Patents and Trademarks